United States Patent
Disser et al.

(10) Patent No.: US 6,624,531 B2
(45) Date of Patent: Sep. 23, 2003

(54) CONTROLLER INPUT VOLTAGE REGULATION BY ACTUATOR POWER MODULATION

(75) Inventors: Robert John Disser, Dayton, OH (US); Juergen Guldner, Munich (DE); Detlef Krukenkamp, Lohhof (DE); Carsten Krukenkamp, Unterschleissheim (DE); Jeff A. Foust, Eaton, OH (US); David Wayne Graber, Millington, MI (US); Patrick A. Mescher, Bellbrook, OH (US)

(73) Assignees: Delphi Technologies, Inc., Troy, MI (US); BMW Group (DE)

( * ) Notice: Subject to any disclaimer, the term of this patent is extended or adjusted under 35 U.S.C. 154(b) by 162 days.

(21) Appl. No.: 09/974,693

(22) Filed: Oct. 9, 2001

(65) Prior Publication Data

US 2003/0067221 A1 Apr. 10, 2003

(51) Int. Cl.[7] ................................. B60R 1/00
(52) U.S. Cl. .................................... 307/10.1
(58) Field of Search .................. 307/9.1, 10.1; 361/18, 23, 30, 31, 33, 90, 91.1, 92

(56) References Cited

U.S. PATENT DOCUMENTS

| 4,707,758 A | * | 11/1987 | Matsuda ...................... 361/18 |
| 5,200,674 A | * | 4/1993 | Fujimoto et al. ............. 318/34 |
| 6,147,597 A | * | 11/2000 | Facory ................... 340/425.5 |

* cited by examiner

Primary Examiner—Matthew V. Nguyen
(74) Attorney, Agent, or Firm—Scott A. McBain

(57) ABSTRACT

A voltage regulating control system for vehicle systems which includes a power supply providing electrical power to the system and having a predefined maximum voltage. A controller controls an actuator performing a vehicle system function and the electrical load in the system wherein the controller has a first predefined minimum operating voltage. A voltage regulator communicates with the controller and the power supply and senses a system input voltage in the system. In response to a sensed voltage dip in excess of a predetermined value, the regulator changes an effective electrical impedance of the system to maintain the system voltage at a predefined minimum voltage greater than the first predefined minimum operating voltage required by the controller.

8 Claims, 2 Drawing Sheets

CONTROLLER INPUT VOLTAGE REGULATION BY ACTUATOR POWER MODULATION

TECHNICAL FIELD

The present invention generally relates to vehicle electrical systems and in particular to methods and circuitry for regulating vehicle control system voltages.

BACKGROUND OF THE INVENTION

Mechanical linkage and hydraulic pressure operated controls for vehicles are well known in the art, and generally comprise control input devices operated by a user such as steering wheels, shift levers, and foot pedals which are directly interlinked with various vehicle controls individually or by combinations of mechanical push rods, gears, cables, or pressurized hydraulic systems. Such controls have been utilized in vehicles such as automobiles and trucks since the inception and initial manufacturer of such vehicles. As technology through the years has advanced, so also have these mechanical linkage and hydraulic pressure systems advanced with newer and more advanced innovations. Newer forms of technology wherein every vehicle now has one or more on-board computers in various forms assisting in vehicle operation and control. These computers through interconnection with various sensors and vehicle controls can rapidly acquire various objective input data, analyze this data, and then appropriately adjust the vehicle controls to more readily optimize the operation of the various vehicle systems and controls. As a result of the rapid computational power and speed of the computers, control commands can be issued at a much faster rate than older technology mechanical system configurations can respond. The requirement for increased control response time were initially felt in the aerospace industry where modern aircraft have evolved from the use of mechanically linked controls to electrically operated controls in a concept commonly known as "fly-by-wire".

As the quest for more and more improvements in vehicle efficiency, more accurate controls, and improved response times, the automotive and vehicle industries are turning with greater frequency to additional electronics and electrical systems to provide necessary vehicle controls. Initially, implementation of various electrical control systems was limited to vehicle systems such as power windows and power door locks, the industry is now moving to replace mechanically operated, systems with electrically operated systems. Braking systems, for example, is potentially one such system. Previously, to ensure the integrity of a vehicle system such as brakes one only had to ensure that the mechanical linkages were secure and properly adjusted and that the brake hydraulic system also maintained its integrity. With the implementation of electrical and electronic controls, maintenance of electric power to vehicle systems is now paramount.

For example, by switching the vehicle braking system from one of mechanical linkages and hydraulic pressure systems to a purely electrical system, the only interconnection between the driver and the individual brakes at the four corners of the vehicle are electrical conductors. The input voltage to a load in such a system dips at the input terminals due to the current draw of the load through impedances from wiring, connectors, and the power source (battery or alternator). Large load current spikes cause severe voltage dips in the system, and some of these voltage dips may be severe enough to cause controller "brown outs" or resets. Consequently, in a purely electrical control of a vehicle system special attention must be paid to the fail-safe conditions of the electrical system.

Therefore, maintaining operability during various system failure modes generally requires that some minimum amount of electric power be supplied to the various components to preclude the total loss of the system and potential loss of control of the vehicle as a result of the voltage "brown outs" or controller resets. Such instances of power dissipation, voltage dips, and voltage transients which individually or in some combination can have the combined effect of failing to meet the basic functionality of the system. One such effect could be causing a microprocessor system to reset thereby causing that system or that portion of the system to go off-line and thus its function become unavailable to the vehicle operator. Similar problems exist in the event of the failure of the on-board electric power generation system such that the vehicle must rely strictly on available stored battery power. In this case, system availability remains paramount even though the systems must operate in a degraded mode to maintain that availability. Thus, there is a need to provide a methodology by which the basic characteristics of the electric power are maintained to prevent, to the greatest extent possible, the failure or operational cessation of electrical systems on a vehicle.

SUMMARY OF THE INVENTION

One aspect of the invention is a vehicle system incorporating a voltage regulating control. The system includes a power supply providing electrical power to the system and having a predefined maximum voltage. A controller controls an actuator performing a vehicle system function and the electrical load in the system wherein the controller has a first predefined minimum operating voltage. A voltage regulator communicates with the controller and the power supply and senses a control system input voltage in the control system. In response to a voltage dip in excess of a predetermined value, the regulator changes an effective electrical impedance of the control system to maintain the system voltage at a predefined minimum voltage greater than the first predefined minimum operating voltage required by the controller.

Another aspect of the invention is a method for regulating the voltage of a vehicle system of the type having a power supply, a controller, and an actuator. The method comprises the steps of defining a minimum system voltage; sensing a current demand for the system during operation of the actuator; increasing an effective impedance of the actuator when the sensed current demand approaches a predefined maximum; and limiting the system voltage to a predefined minimum.

These and other features, advantages and objects of the present invention will be further understood and appreciated by those skilled in the art by reference to the following specification, claims, and appended drawings.

DESCRIPTION OF THE PREFERRED EMBODIMENT

Figure 1:
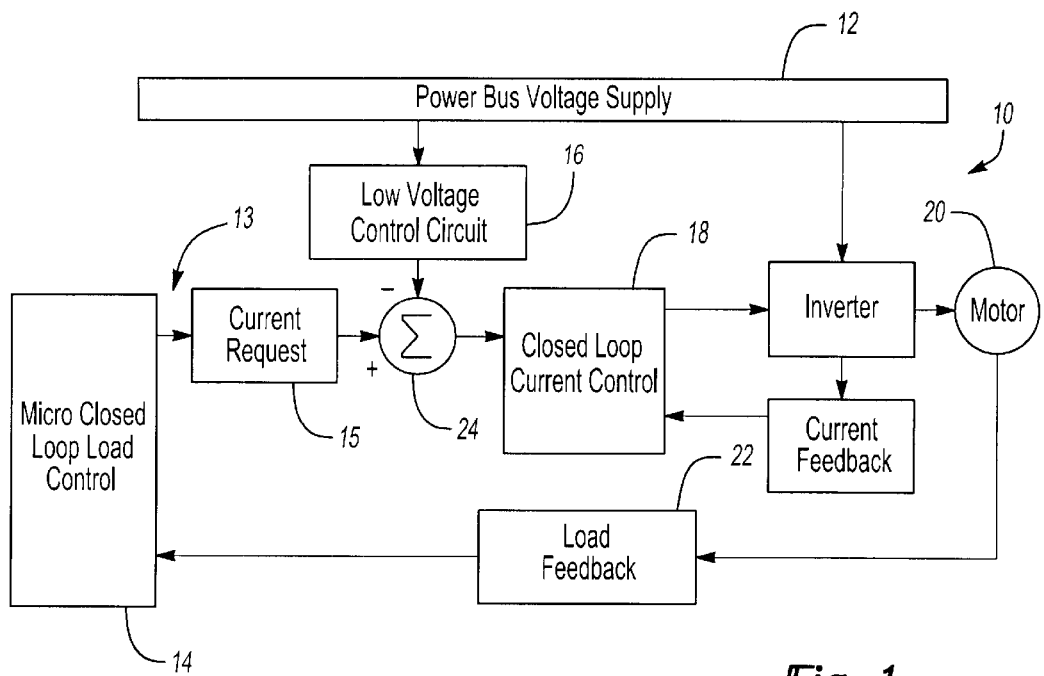
FIG. 1 is a block diagram of a system configuration incorporating an analog embodiment of a bus voltage regulating function.
Figure 2:
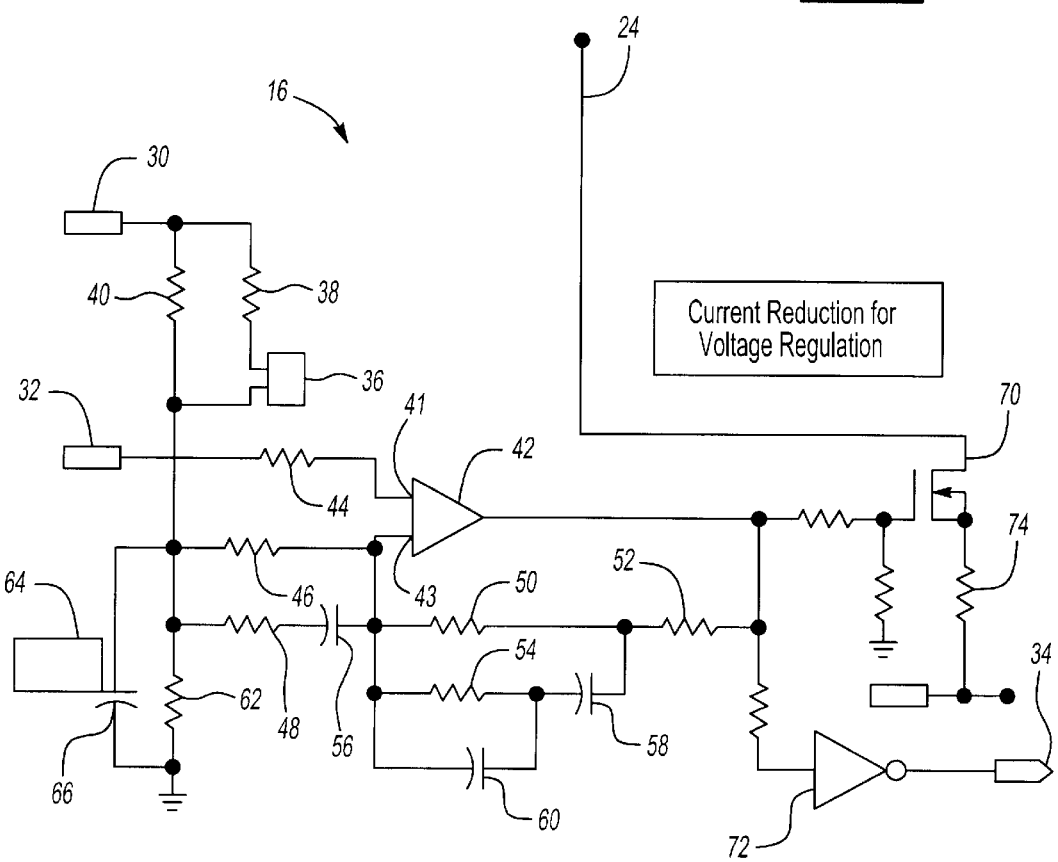
FIG. 2 is an analog low voltage control circuit diagram of the bus voltage regulating embodiment of the system in FIG. 1.

Referring to FIGS. 1 and 2, wherein like numerals indicate like or corresponding parts throughout the several views, a vehicle system generally represented at 10. System 10 includes a power supply 12, such as a standard 12-volt power bus, that provides electrical power to the system 10. A low voltage control circuit 16 according to one embodiment of the invention is interposed between power supply 12 and a control loop 13 at summer 24. Control loop 13 includes a controller 14 into which is directed a plurality of data signals (not shown) and operator initiated control commands. Controller 14 in turn issues commands to control loop 13 to initiate desired actions by actuator or motor 20 for performing a desired system function such as, for example, actuating a brake, turning a wheel, or some other critical vehicle operation function. Control loop 13 further includes feedback loops 18 and 22 for evaluating and maintaining desired control of system functioning in a manner well known in the art, and therefore an explanation of which is not deemed necessary to an understanding of the preferred embodiments.

FIG. 2 represents an analog circuit that represents one possible embodiment of a low Voltage Control Circuit 16 for regulating the voltage of the electrical signal in loop 13 above a predefined minimum. The predefined minimum voltage is some voltage greater than the minimum operation voltage requirement for controller 14. By maintaining loop 13 voltage above the minimum operating voltage for controller 14, controller 14 can be prevented from entering a reset mode as a result of a voltage dip occurring during a high current demand request by motor 20. The bus voltage to be regulated comes into circuit 16 as the SWBAT input 30. The +5V signal 32 provides a control reference for circuit 16. The VREG* signal 34 is an output from circuit 16 as a signal to indicate to system 10 that the power bus 12 voltage has dipped and the voltage regulation function of circuit 16 is modifying the original current request. When VREG* 34 is a logic "1", the voltage control circuitry is off and the system 10 is in normal operation. When VREG* 34 is a logic "0", the voltage control circuitry is active and the system is in a reduced output capability condition.

Jumper 36 provides flexibility to connect resistor 38 in parallel with resistor 40 such that the voltage regulation function may be changed to a second voltage such as switching from a 12 volt system to a 42 volt system. For example, jumper 36 is installed to operate in a 12-volt system with a regulation voltage of 7.2 volts and jumper 36 is uninstalled to operate in a 42-volt system with a regulation voltage of 25 volts. With this constraint, further description will refer to SWBAT 30 as a 42-volt system and attempt to regulate the voltage at 25 volts.

Amplifier 42 in conjunction with resistors 44, 46, 48, 50, 52, and 54 and with capacitors 56, 58, and 60 form a closed loop control compensation. Resistor and capacitor values labeled "Unused" are available to modify the compensation as required in various systems. The illustrated configuration provides simple proportional control of the SWBAT voltage 30. The +5V signal 32 provides a control reference to the non-inverting input 41 of amplifier 42.

Resistors 40 and 62 form a voltage divider to generate Vfb 64 such that Vfb=SWBAT*0.1992. Capacitor 66 in conjunction with resistors 40 and 62 creates a low pass filter to eliminate noise effects from SWBAT 30. The cutoff frequency of this filter is sufficiently high in frequency to not influence the operation of the voltage control function of this invention.

Under normal system conditions, the SWBAT 30 voltage is near 42 volts. Even with moderately high current spikes, the SWBAT 30 voltage remains significantly above the 25-volt regulation threshold. In this condition, the voltage of inverting input 43 of amplifier 42 is much higher than the voltage of the non-inverting input 41. This causes the output of amplifier 42 to saturate at 0 volts. When the output of amplifier 42 is below the activating threshold voltage of transistor 70 (typically 2–4 volts), transistor 70 is off and has no effect on the C LIMIT value at summer 24. Also the input to inverter 72 is a logic "0". This cause the VREG* signal 34 to be a logic "1" therefore indicating that the voltage control circuitry is off and the system is in normal operation.

As the SWBAT voltage 30 approaches 25 volts, the voltage at Vfb 64 approaches 5 volts. Under this condition, the voltage of the inverting input 43 and the non-inverting input 41 of amplifier 42 become equal, and amplifier 42 enters the active state. The output of amplifier 42 begins to rise in voltage until it reaches the activating threshold of transistor 70. At this instant, transistor 70 begins conducting current from the C LIMIT summing node 24. This current conduction reduces the current request to the closed loop current control 18, which reduces the load current draw from the power supply 12. This is the beginning of input voltage regulation to maintain a minimum voltage at the input terminals of the system. If the load current continues to increase, SWBAT voltage 30 continues to fall lower (only by millivolts because the circuit is in closed loop control of the SWBAT voltage), and the output voltage of amplifier 42 increases. This increase causes transistor 70 to conduct more current, which reduces the current request, C LIMIT 24, further. The increase in the output voltage of amplifier 42 (also increased conduction of transistor 70) does not permit the continued increase in the load current. This modulation continues to keep the value of the SWBAT voltage 30 near the desired threshold value of 25 volts. While the output of amplifier 42 is above the input threshold of inverter 72, the VREG* signal 34 is at a logic "0" indicating that the voltage control circuitry is active and the system is in a reduced output capability condition. When the load request is reduced and the SWBAT voltage begins to rise above the minimum threshold (25V), the output of amplifier 42 returns to 0 volts, and the system returns to normal operation.

In the event that the SWBAT voltage 30 continues to fall below the 25 volt threshold, the output of amplifier 42 rises to the maximum value causing transistor 70 to enter a maximum conduction condition. Under this situation, the current draw from C LIMIT summing node 24 is forced to the maximum load current reduction value which is defined by resistor 74. Resistor 74 creates a voltage divider with the output impedance of current request circuit 15. The maximum reduction percentage is defined as the value of resistor 74 divided by the sum of resistor 24 and circuit 15 resistance. As the value of resistor 74 decreases, the maximum reduction percentage increases.

The above schematic represents but one embodiment of an analog circuit to perform a voltage limiting function, and those skilled in the art will recognize that other variations of circuit 16 will perform a like function.

Figure 3:
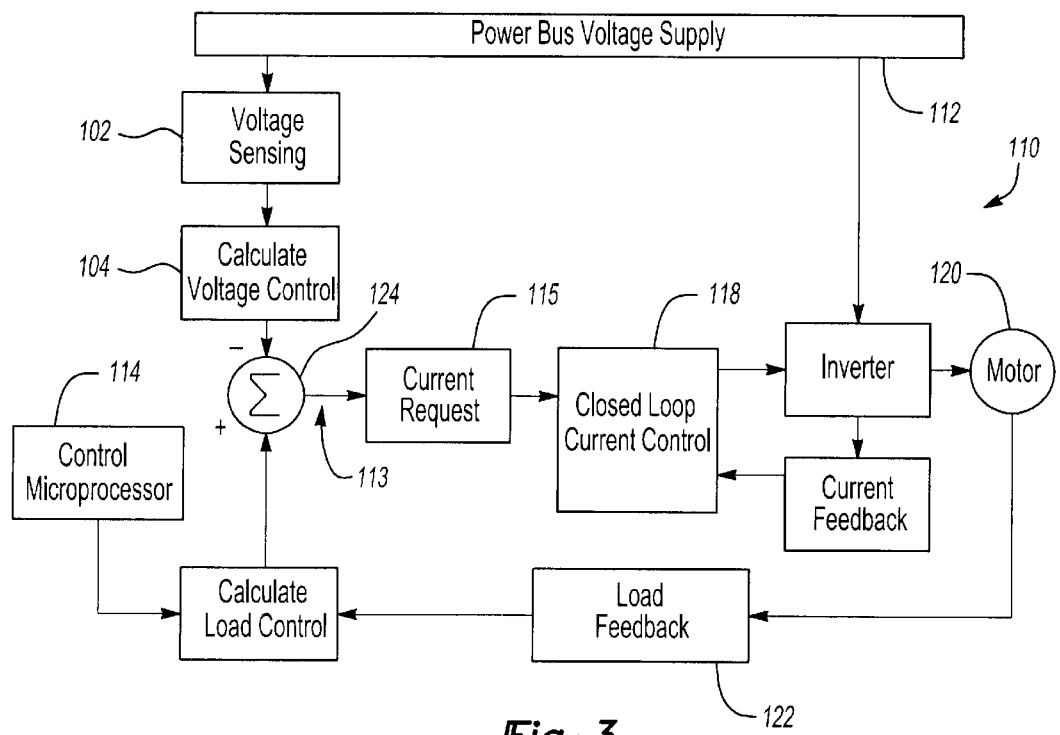
FIG. 3 is a block diagram of a system configuration incorporating a software controlled embodiment of a bus voltage regulating function.
Figure 4:
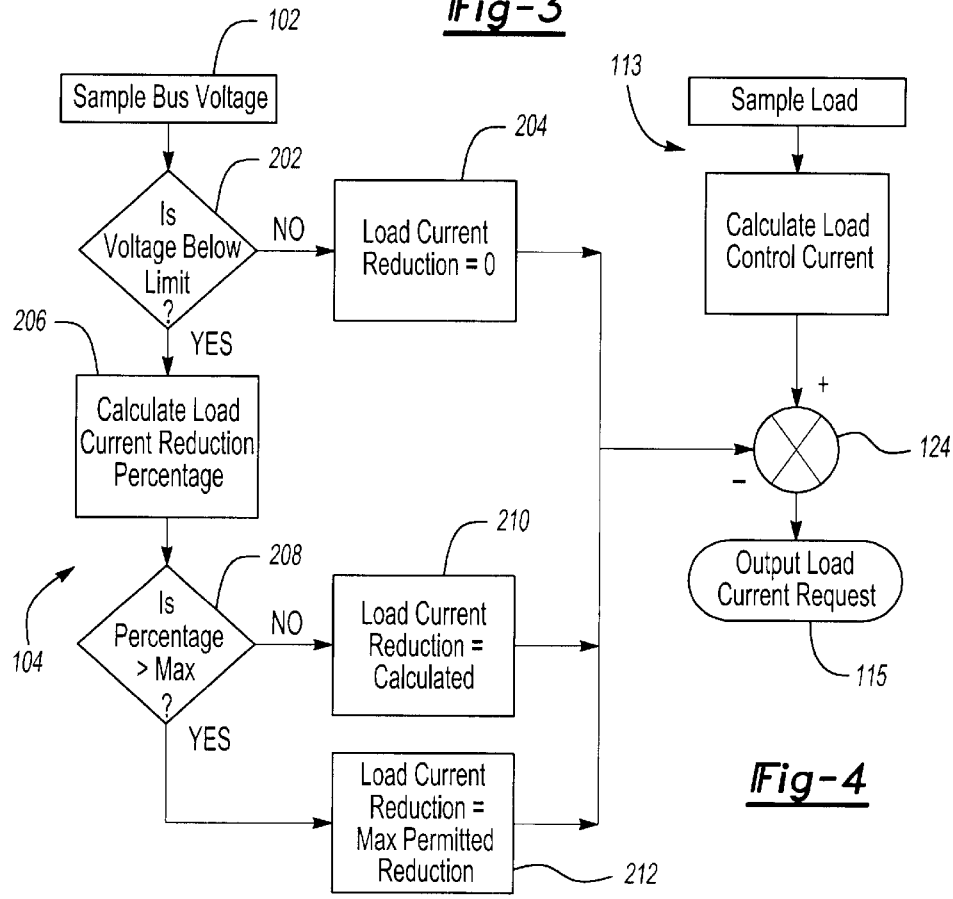
FIG. 4 is a software process flow diagram of the bus voltage regulating embodiment of the system in FIG. 3.

Turning now to FIGS. 3 and 4, another embodiment is illustrated wherein the voltage regulation function is performed in a microprocessor. Like ending numerals indicate like or corresponding parts to the system described in FIG. 1 above. A vehicle system is generally represented at 110. System 110 includes a power supply 112, such as a standard 12-volt power bus, that provides electrical power to the system 110. A voltage sensing function 102 and voltage control calculation function 104 are performed in microprocessor 114 and function to replace control circuit 16 as described in the above embodiment. Control loop 113 includes a microprocessor controller 114 into which is directed a plurality of data signals (not shown) and operator initiated control commands. Controller 114 in turn issues commands to control loop 113 to initiate desired actions by actuator or motor 120 for performing a desired system function such as, for example, actuating a brake, turning a wheel, or some other critical vehicle operation function. Control loop 113 further includes feedback loops 118 and 122 for evaluating and maintaining desired control of system functioning in a manner well known in the art, and therefore an explanation of which is not deemed necessary to an understanding of the preferred embodiments.

Voltage Sensing 102 and Voltage Control Calculation 104 functions which replace analog circuit 16 in the embodiment illustrated in FIGS. 1 and 2 as previously noted are performed by software in microprocessor 114 in the instant embodiment. A flow diagram of these functions is illustrated in FIG. 4 and their operation is discussed below.

Referring now to FIG. 4, the Voltage Sensing 102 and Voltage Control Calculation 104 functions are illustrated according to their respective steps. Sampling of the power bus voltage is performed at 102. Microprocessor 114 then compares the sampled voltage to predefined values which as in the previous example are illustrated as 42 volts for the power bus voltage, and a threshold voltage of 25 volts. At step 202, Voltage Control Calculation 104 function determines whether the sampled bus voltage is below the threshold limit of 25 volts. If not the Load Current Reduction is set at zero as shown in block 204 and the power signal is transmitted unchanged to summer 124. If decision 202 determines that the voltage is below the 25 volt threshold, microprocessor calculates the desired load current reduction percentage at 206. The monitoring of reduction percentage is illustrated at 208. If the reduction percentage is less than or equal to the maximum, the load current reduction is performed to the calculated level at 210 and transmitted to summer 124. If, on the other hand, the calculated load current reduction is greater than the maximum, the load current reduction is set to the maximum permitted at 212 and transmitted to summer 124. The maximum load current reduction must be defined as a system condition to maintain proper system operation.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principals of patent law, including the doctrine of equivalents.

What is claimed is:

1. A vehicle system incorporating a voltage regulating control, said system comprising:
    a power supply providing electrical power having a first predefined maximum voltage;
    a controller for controlling the electrical load in said system, said controller having a first predefined minimum operating voltage;
    a voltage regulator in communication with said controller and said power supply wherein said regulator senses a control system input voltage in said system, and in response to a voltage dip in excess of a predetermined value said regulator changes an effective electrical impedance of said system to maintain said system voltage at a second predefined minimum voltage greater than said first predefined minimum operating voltage; and
    at least one actuator receiving voltage regulated control inputs from said controller for performing a vehicle system function.

2. The system according to claim 1 wherein said voltage regulator is an analog circuit in electrical communication with said controller and said actuator.

3. The system according to claim 2 wherein said analog circuit includes:
    an amplifier responsive to a decreasing voltage in said system such that said amplifier becomes active when said second predefined minimum system voltage is approached, said amplifier becomes active providing an increased voltage output; and
    a transistor responsive to said amplifier voltage output, such that said transistor enters a conductive state when an activation threshold voltage is sensed by said transistor, said conductive state of said transistor then conducting current from said system to decrease a current request for said actuator and thereby maintaining a system voltage at said second minimum voltage.

4. The system according to claim 3 wherein said circuit further includes a jumper for selecting between alternate predefined voltage minimums.

5. The system according to claim 4 wherein said circuit further includes a logical output to said controller, said logical output having a first state communicating an active state of said analog circuit to said controller and a second state communicating an inactive state of said analog circuit.

6. The system according to claim 1 wherein:
    said controller is a microprocessor; and
    said voltage regulator comprises software function within said microprocessor.

7. The system according to claim 6 wherein said software function comprises the steps of:
    sampling said power supply voltage;
    calculating a current load reduction when the sampled voltage is below a predefined limit;
    determining whether the calculated reduction is greater than a predefined maximum;
    reducing the current load by the calculated reduction when the calculated reduction is less than the predefined maximum; and
    reducing the current load by the predefined maximum when the calculated reduction is equal to or greater than the predefined maximum.

8. A method for regulating the voltage of a vehicle system of the type having a power supply, a controller, and an actuator, said method comprising the steps of:
    defining a minimum system voltage;
    sensing a system input voltage for said system during operation of the actuator;
    increasing an effective impedance of the actuator when the sensed system input voltage approaches a predefined minimum; and
    limiting the system voltage to a predefined minimum.

* * * * *